United States Patent [19]
Beach et al.

[11] 3,869,903
[45] Mar. 11, 1975

[54] SETTLING RATE TESTER

[75] Inventors: William A. Beach, Milltown; Richard M. Schlauch, Yardville, both of N.J.

[73] Assignee: The Permutit Company, Inc., Paramus, N.J.

[22] Filed: July 19, 1972

[21] Appl. No.: 273,139

[52] U.S. Cl. ................................. 73/61.4, 209/160
[51] Int. Cl. ......................................... G01n 15/04
[58] Field of Search ................ 73/61.4, 432 PS, 32; 356/102; 209/160, 140

[56] References Cited
UNITED STATES PATENTS

| | | | |
|---|---|---|---|
| 1,667,783 | 5/1928 | Harkort | 209/160 |
| 1,673,849 | 6/1928 | Stebbins | 209/140 X |
| 1,917,156 | 7/1933 | Rauschenbusch et al. | 209/160 X |
| 2,668,365 | 2/1954 | Hogin | 73/32 X |
| 3,519,353 | 7/1970 | Franz et al. | 73/61.4 X |

*Primary Examiner*—Richard C. Queisser
*Assistant Examiner*—Joseph W. Roskos
*Attorney, Agent, or Firm*—Theodore B. Roessel; James A. Rich

[57] ABSTRACT

The settling rate of particulate matter in a fluid is determined by passing a mixture of the fluid and the particulate matter up through an inverted cone at a known flow rate. The particulate matter accumulates at the level in the cone where the upward velocity of the fluid is equal to the settling rate of the particles. Sensors may be used to detect the presence of particles at one or more levels in the tube; and the signals from the sensors may be used to control the operation of a separator.

7 Claims, 4 Drawing Figures

SETTLING RATE TESTER

BACKGROUND OF THE INVENTION

This invention relates to a method and apparatus for determining the settling rate of particulate matter, such as sludge particles, in a fluid.

In many forms of apparatus for treating waste water or similar fluids, impurities are removed from the fluid in the form of sludge particles which settle out of the fluid as the fluid passes up through the separator. Typical examples of this type of separator are illustrated in *Permutit*[R] *Precipitator*, Bulletin No. E2204, Permutit Co., Paramus, N.J., 1963. Frequently, in separators of this type, the rate at which the sludge particles settle must be determined periodically in order to optimize flow rates, pH, the type or amount of coagulants, flocculants or other chemicals to be added and a variety of other operating parameters. The most common method of determining sludge settling rates is the conventional jar test, in which the waste to be treated and chemicals to be added are mixed in a jar and allowed to stand until the particles have settled out. This method provides a rough example of what will happen in the separator, but it leaves many questions unanswered. For example, the jar test does not provide a quantitative measure of the settling rates of the whole spectrum of sludge particles which may be present in the separator; thus it does not provide a very good picture of what types of particles are likely to cause problems. Another shortcoming of the jar test is that the particles are not subjected to the same settling conditions or hydraulic stresses that are present in the separator. The hydraulic stresses in the separator may fracture weak particles that appear to be excellent in the jar test.

SUMMARY OF THE INVENTION

It is an object of this invention to provide an improved method and apparatus for determining the settling rate of particulate matter in a fluid. A further object is to provide a method and apparatus which will simulate the conditions which are actually present in a typical upflow separator. The invention provides a method and apparatus in which a mixture of the particulate matter and the fluid are passed up through an inverted cone at a known flow rate. The particulate matter accumulates at the level in the cone where the upward velocity of the fluid is equal to the settling rate of the particulate matter. Thus, the settling rate of any individual particle and the range of settling rates of all the particles which are present can be determined.

Another object is to provide a method and apparatus which minimizes the danger of damage to the particles during the test and thereby insures accurate results. This is accomplished by passing a stream of the fluid up through the cone and adding the particles to the fluid in the cone. Thus, the particles always remain in the cone and they are not exposed to the pump or the like which circulates the carrier fluid, which helps to minimize breakage of the sludge particles.

A further object of this invention is to provide apparatus for monitoring and/or controlling the operation of a separator. Fluid is withdrawn from the separator and passed up through a inverted cone at a flow rate which simulates the flow rate of the fluid through the separator. The particulate matter in the fluid accumulates at a level in the cone which simulates the level at which the particles accumulate in the separator. Sensors, such as photocells, are provided for detecting particles at one or more levels in the cone and the signals from the sensors may be used to control the separator automatically.

Other objects and advantages of this invention will become apparent from the following description.

DRAWINGS

DETAILED DESCRIPTION

Figure 1:
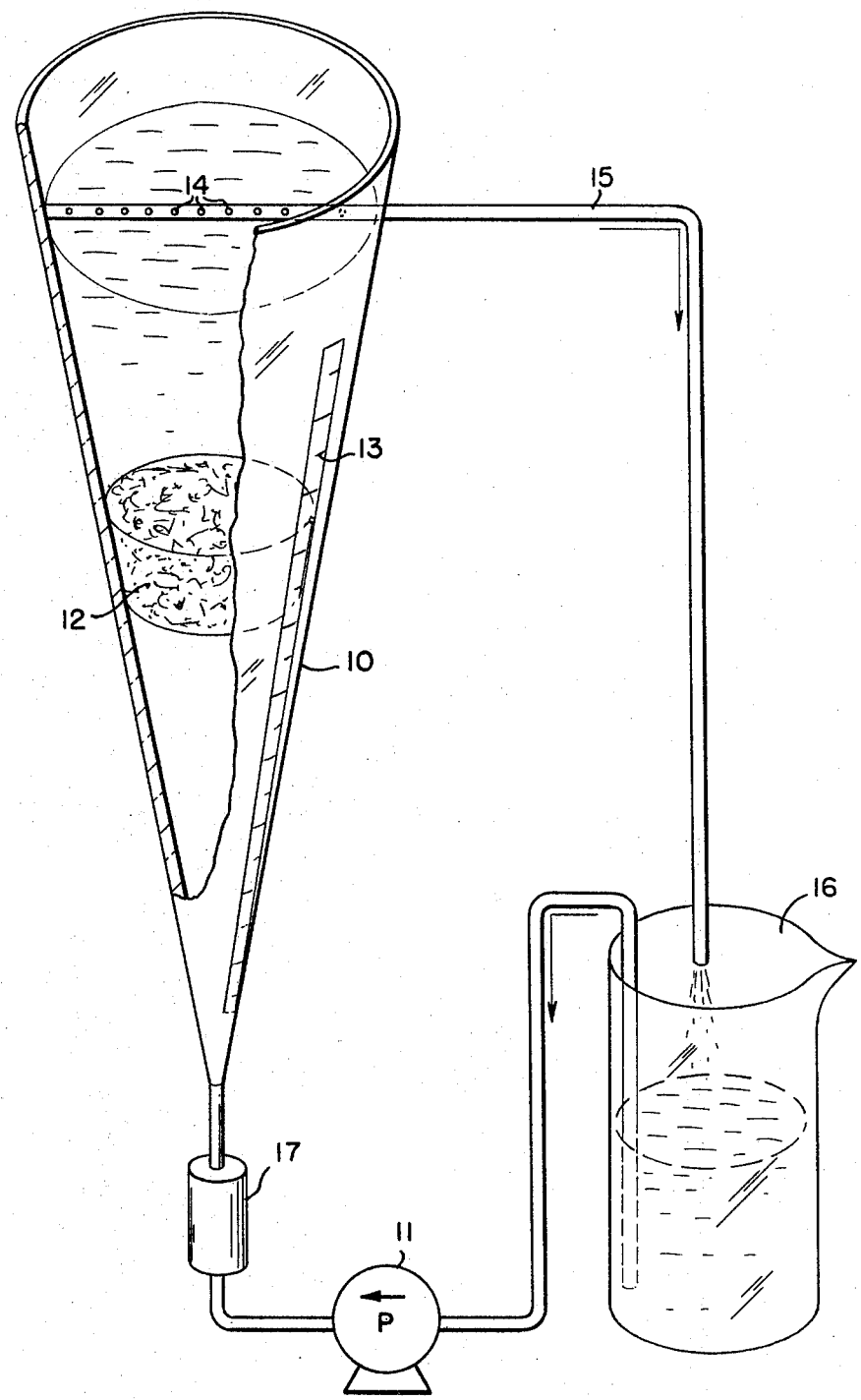
FIG. 1 illustrates one embodiment of this invention which utilizes inexpensive, readily available laboratory items.

Referring to FIG. 1, fluid is passed up through inverted cone 10 by a pump 11. Any particulate matter 12 in the fluid accumulates at the level in cone 10 where the upward velocity of the fluid is equal to the settling rate of the particles. Thus, the particles form a sludge blanket in the cone which simulates the sludge blanket which is formed in typical upflow separators. The flow rate at any level, and thus, the settling rate of the particles at that level may be read on a scale 13 attached to or engraved in the side of cone 10.

The remaining clear fluid passes through holes 14 in an overflow pipe 15 back to a storage reservoir 16 such as a laboratory beaker. The pump 11, which is preferably a constant volume, positive displacement pump such as a tube pump, sucks the fluid from the beaker and pumps it through a rotameter 17 and back up through the cone. Preferably, the fluid is maintained at a temperature approximately the same as the temperature at which the larger separator operates.

A wide variety of types and sizes of cones may be used depending upon the material being tested, the separator that is being simulated, the accuracy desired and such pragmatic considerations as the cost and availability of different materials. Generally, cones with a relatively small angle (defined by the opposite sides of the cone) and a relatively small diameter at the bottom of the cone are preferred. The smaller the cone angle, the more the particles will spread out along the cone. This facilitates observation of how settling rates vary with the type and size of the particles. Cones with a relatively narrow bottom are preferred because, if the bottom is approximately the same size as the tubing to which it is connected, there are no abrupt changes in the flow as the fluid enters the cone; and smooth, uniform flow up through the cone is promoted. Also, small cones reduce the amount of fluid and the size of the pump needed. In typical cases, cones having an angle of from about 10° to 20° and a diameter at the bottom of the cone of from about one-quarter inch to one-half inch have been found to be particularly suitable. However, larger or smaller cones and cones with larger or smaller angles may be preferable in a particular situation.

The sludge particles may be added to the fluid in a variety of ways. For example, the particles may be produced in a standard jar test and transferred to the cone.

Alternatively, the water to be treated and the chemicals to be added may be mixed and coagulated in the cone. Then, the pump can be started and the sludge particles will accumulate at their equilibrium level.

Figures 2, 3:
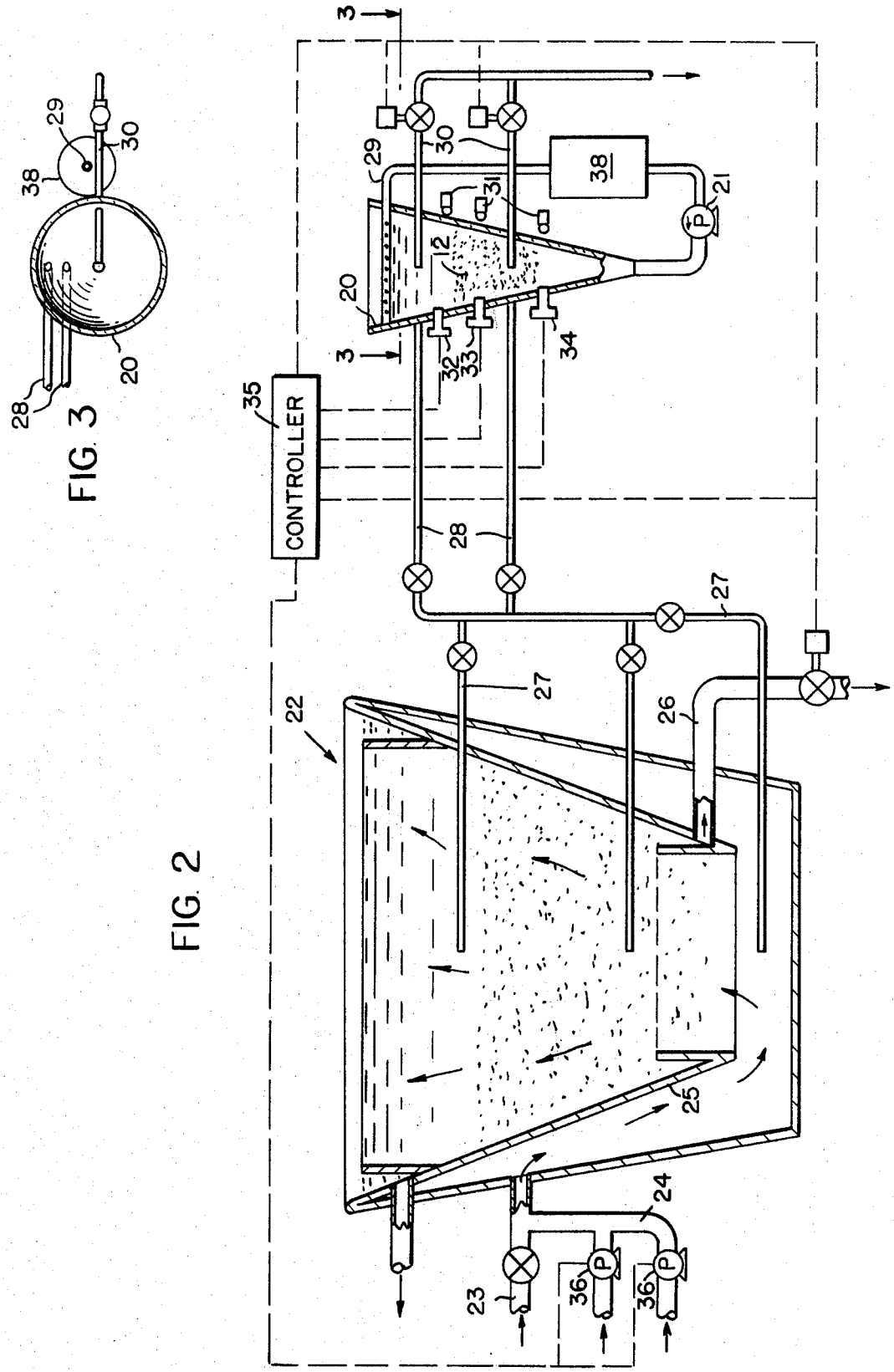
FIG. 2 illustrates an embodiment which may be used to monitor and/or control the operation of an upflow separator.
FIG. 3 is a view, taken along lines 3—3 of FIG. 2, of the measuring cone of the embodiment shown in FIG. 2.

FIG. 2 illustrates still another means for adding the sludge particles to the measuring cone. In this embodiment, an inverted cone 20, through which a carrier fluid is circulated by a pump 21, is used to monitor and control the operation of an upflow separator 22. The fluid to be treated, such as waste water, is added to the separator through inlet line 23 and mixed with flocculants, coagulants or the like supplied through one or more chemical feed lines 24. The fluid and chemicals form sludge particles which settle out of the fluid as it passes up through a cone 25 at the center of the separator 22. The purified water passes out through the top of the separator, while the sludge particles are blown down, either continuously or periodically, through line 26.

Separator 22 is provided with one or more lines 27 for withdrawing samples. The sample lines are manifolded with one or more lines 28 through which the samples are injected into the inverted cone 20. The particulate matter 12 in these samples accumulates at its equilibrium level in the cone while the fluid in the sample mixes with the carrier fluid and passes up and out of the cone through overflow pipe 29 to storage tank 38.

As is best shown in FIG. 3, the line or lines 28 that feed the sample to the cone 20 are tangentially connected to the cone. In addition, the cone is provided with one or more blow-down lines 30, located at substantially the same levels as the sample inlet lines 28, through which a mixture of fluid and particulate matter may be withdrawn from the center of the cone.

Tangential injection of the sample agitates the sludge particles in the cone slightly, thereby helping to maintain uniform distribution of the particles. In addition, since all the particles must move in from the outer edge of the cone to the central blowdown line, the residence time for particles in the cone is reasonably uniform for all particles.

The flow rate through the sample inlet and blowdown lines 28, 30 and the rate at which the carrier fluid is circulated by pump 21 are adjusted so that the rate at which the fluid flows up through cone 20 simulates the flow rate of fluid up through the central cone 25 of the separator. Also, the sample, carrier fluid and/or the cone may be heated or cooled so that the temperature of the fluid in the cone approximates the temperature in the separator 22. Thus, conditions in the cone are similar to the conditions in the separator and the separator can be controlled automatically by providing sensors to detect sludge particles at one or more levels in the cone.

Cone 20 is preferably made of a transparent material. One or more lights 31 are positioned on one side of the cone and one or more photocells 32, 33, 34 are positioned on the opposite side. The photocells are connected to a controller 35 that regulates the rate at which the various chemicals are fed to the separator 22 and/or the rate at which sludge particles are blown down from the separator through line 26 and/or from the cone through line 30. Thus, the operation of the separator can be automatically controlled without installing any sensors in the separator itself.

Figure 4:
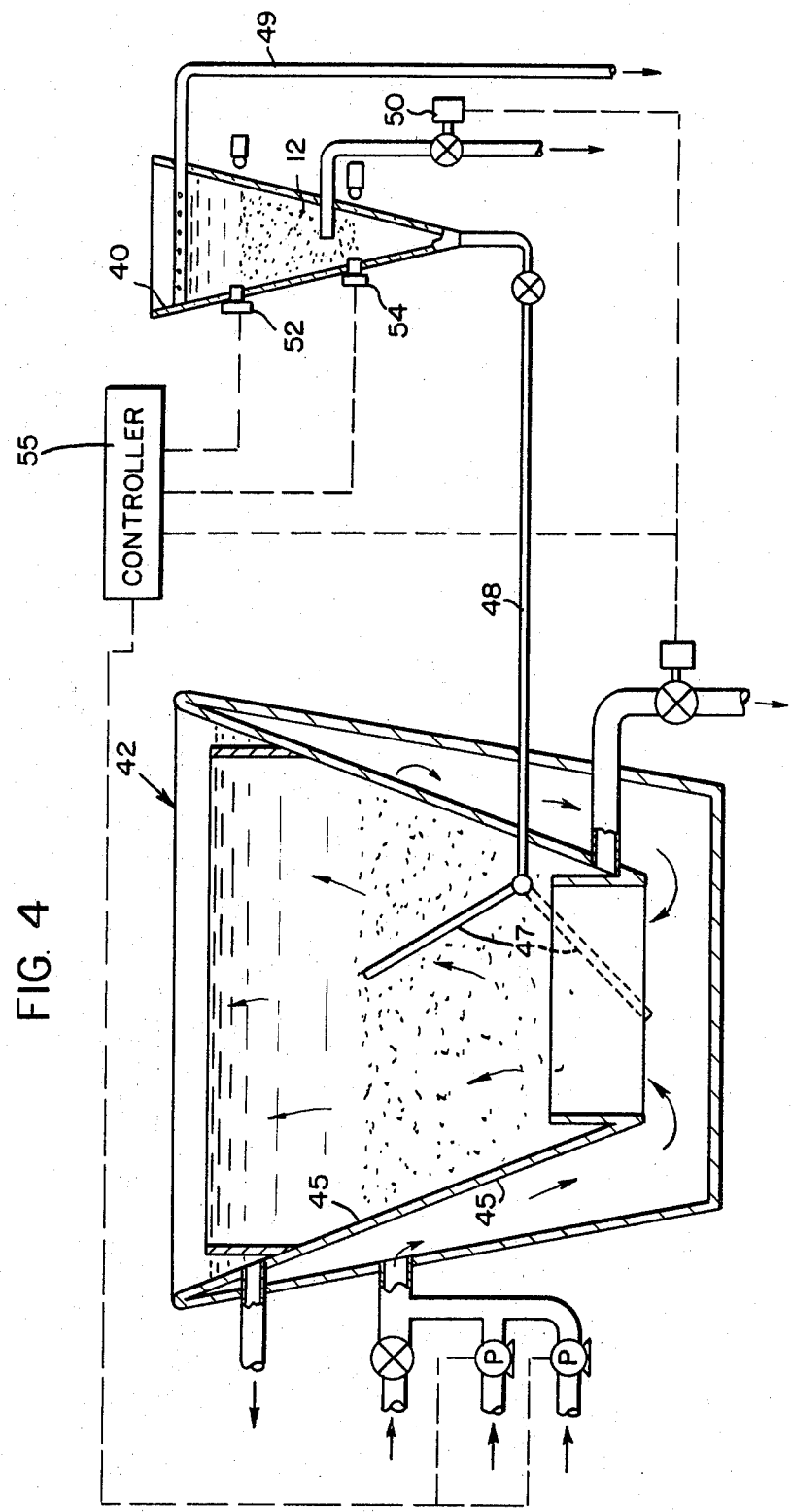
FIG. 4 illustrates a slightly different system for monitoring and/or controlling the operation of a separator.

Another system for monitoring and/or controlling a separator is illustrated in FIG. 4. In this system fluid is continuously withdrawn from the separator 42 through a single sample line 48, which has a swing pipe 47 at the separator end that can be pivoted (as shown in phantom) to withdraw samples from different levels in the separator. Samples are usually taken near the top of the sludge blanket because the settling rate of the particles that accumulate there determines the maximum flow rate that can be used.

The fluid withdrawn from separator 42 passes through line 48 and up through the inverted cone 40 at a rate which simulates the flow rate of the fluid up through the central cone 45 of the separator 42. Particulate matter 12 in the fluid accumulates at its equilibrium level in the cone 40, while the fluid passes up and out through overflow line 49. The sludge particles that accumulate in the cone 40 are periodically blown down through valve 50. This system, like the system of FIG. 2, is equipped with photocells 52, 54 and a controller 55 for regulating chemical feed to the separator 42 and/or blowdown of sludge particles from the separator and/or the inverted cone 40.

Thus, the operation of the separators shown in FIGS. 2 and 4 can be controlled automatically without installing any sensors in the separators themselves. Consequently, the sensors and controls can be placed in a location where they can be easily monitored. Furthermore, locating the inverted cones outside the separators makes it easier to keep the cones clean, which helps prevent erroneous signals from the photocells.

While we have described our invention in connection with the separation of sludge particles from water; it is equally applicable to the testing and/or monitoring of the separation of other types of particulate matter, including liquid particles such as droplets of mercury or oil, from any fluid having a different specific gravity. It should also be clear that this invention may be used to monitor and/or control the operation of many other types of separators. These, and many other modifications may be made to the embodiments described above within the scope of this invention, which is defined by the appended claims.

We claim:

1. Apparatus for measuring the settling rate of particulate matter in a fluid comprising:
   a. an inverted cone;
   b. means for passing a stream of the fluid up through the cone at a known flow rate, at least one inlet pipe tangentially connected to the cone, and means for passing a mixture of fluid and particulate matter through the inlet pipe into the cone, whereby the particulate matter accumulates at the level within the cone where the upward velocity of the fluid is equal to the settling rate of the particulate matter; and
   c. means for indicating the settling rate of particles that accumulate at different levels in the cone.

2. Apparatus according to claim 1 further comprising a blowdown pipe adapted to remove a mixture of fluid and particulate matter from the center of said cone at substantially the same height as said tangential inlet pipe.

3. Apparatus for monitoring the operation of a separator wherein fluid flows up through a gradually expanding separation zone, whereby particulate matter settles out of the fluid in the separation zone, comprising:
  a. an inverted cone located outside the separator;
  b. means for withdrawing fluid from the separator and passing the fluid up through the inverted cone at a flow rate the simulates the flow rate of fluid up through the separation zone; whereby particulate matter in the fluid accumulates at a level in the inverted cone which simulates the level at which particulate matter accumulates in the separation zone; and
  c. means for sensing particulate matter at at least one elevation in the cone.

4. Apparatus according to claim 3 wherein the means for withdrawing fluid from the separator and passing the fluid up through the cone comprises:
  a. a fluid conduit having a first end connected to the separator and a second end tangentially connected to the cone; and
  b. means for passing a carrier fluid up through the cone, whereby the fluid withdrawn from the separator passes through the fluid conduit and mixes with the carrier fluid.

5. Apparatus according to claim 3 including a blowdown pipe adapted to remove a mixture of fluid and particulate matter from the center of the cone at substantially the height of said second end of said fluid conduit.

6. Apparatus according to claim 3 wherein the inverted cone is transparent and the means for sensing particulate matter comprises at least one light on one side of the cone and at least one photocell on the opposite side of the cone.

7. Apparatus according to claim 3 including means to control the operation of said separator in response to signals produced by said sensing means.

* * * * *